(12) United States Patent
Nakanishi et al.

(10) Patent No.: US 11,104,238 B2
(45) Date of Patent: Aug. 31, 2021

(54) VEHICLE BODY FRONT STRUCTURE

(71) Applicant: HONDA MOTOR CO., LTD., Tokyo (JP)

(72) Inventors: Yukinobu Nakanishi, Wako (JP); Hirotaka Iguchi, Wako (JP); Hideaki Ito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 148 days.

(21) Appl. No.: 16/568,882

(22) Filed: Sep. 12, 2019

(65) Prior Publication Data

US 2020/0101854 A1    Apr. 2, 2020

(30) Foreign Application Priority Data

Sep. 27, 2018  (JP) .............................. JP2018-181349

(51) Int. Cl.
| | |
|---|---|
| *B60Q 1/26* | (2006.01) |
| *B62D 25/12* | (2006.01) |
| *B60R 13/06* | (2006.01) |
| *B60K 15/05* | (2006.01) |
| *B60L 53/16* | (2019.01) |

(52) U.S. Cl.
CPC .............. *B60L 53/16* (2019.02); *B60K 15/05* (2013.01); *B60Q 1/2661* (2013.01); *B60R 13/06* (2013.01); *B62D 25/12* (2013.01); *B60K 2015/053* (2013.01)

(58) Field of Classification Search
CPC ........ B62D 25/10; B62D 25/12; B60R 13/06; B60Q 1/2661; B60K 15/05; B60K 2015/053; B60K 2015/0553; H01R 13/52; H01R 13/5213; H01R 13/5202; H01R 2201/26; B60L 53/16

See application file for complete search history.

(56) References Cited

U.S. PATENT DOCUMENTS

| | | | | |
|---|---|---|---|---|
| 4,257,642 | A * | 3/1981 | Sampson | ............... B60K 15/05 |
| | | | | 292/338 |
| 7,677,631 | B1 * | 3/2010 | Zischke | ................. B60K 15/05 |
| | | | | 296/97.22 |
| 9,227,509 | B1 * | 1/2016 | Jones | ..................... B60K 15/05 |

(Continued)

FOREIGN PATENT DOCUMENTS

| | | |
|---|---|---|
| EP | 2740624 A1 | 6/2014 |
| JP | 60104322 U | 7/1985 |

(Continued)

OTHER PUBLICATIONS

Notice of Reasons for Refusal for Japanese Patent Application No. 2018-181349 dated Apr. 3, 2020; 6 pp.

*Primary Examiner* — Gregory A Blankenship
(74) *Attorney, Agent, or Firm* — Armstrong Teasdale LLP

(57) ABSTRACT

Provided is a vehicle front body structure including a port device (30) received in a housing (36) and mounted to a vehicle body under a front hood (7). A lid (58) is provided on the housing to selectively close a port opening (21) in the front hood, and the lid includes a lid plate (59) including a light transmitting base material, and a reinforcing member (60) attached to an inner surface of the lid plate, the reinforcing member extending along an intermediate part of the lid plate with respect to a fore and aft direction of the vehicle body.

17 Claims, 12 Drawing Sheets

(56) References Cited

U.S. PATENT DOCUMENTS

Figure 1:
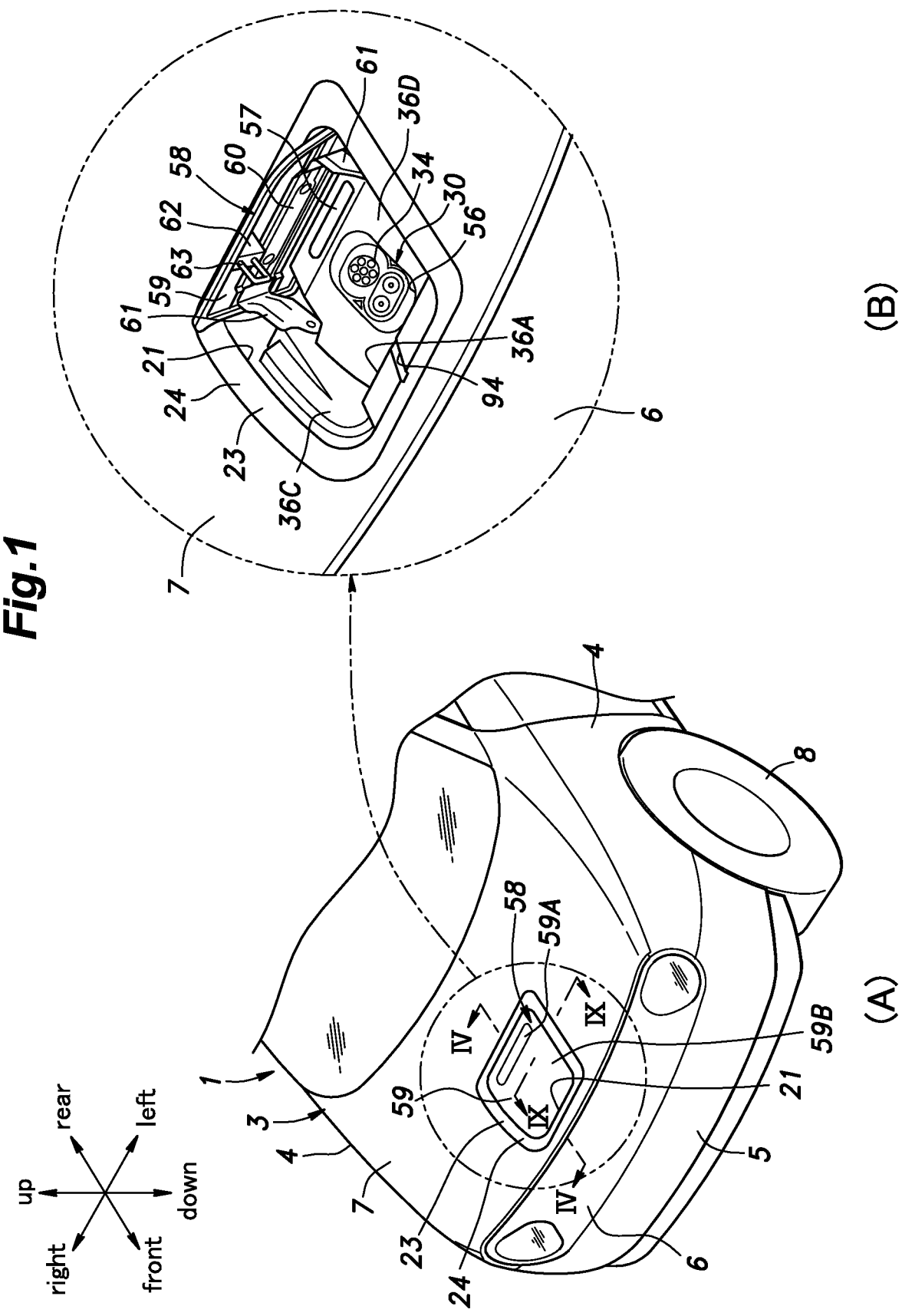

| | | | | |
|---|---|---|---|---|
| 9,381,814 B2* | 7/2016 | Lee | | B60L 3/0007 |
| 2010/0026238 A1* | 2/2010 | Suzuki | | B60Q 1/2661 |
| | | | | 320/109 |
| 2011/0043355 A1* | 2/2011 | Chander | | B60K 15/05 |
| | | | | 340/455 |
| 2011/0285165 A1* | 11/2011 | Baba | | B60K 15/05 |
| | | | | 296/97.22 |
| 2012/0049799 A1* | 3/2012 | Terashima | | B60L 53/14 |
| | | | | 320/109 |
| 2013/0153257 A1* | 6/2013 | Yamamaru | | B62D 25/24 |
| | | | | 174/67 |
| 2013/0157485 A1* | 6/2013 | Yamamaru | | B60K 15/04 |
| | | | | 439/147 |
| 2015/0183331 A1* | 7/2015 | Yamamaru | | B60L 53/11 |
| | | | | 701/22 |
| 2015/0191093 A1* | 7/2015 | Yamamaru | | B60L 11/1818 |
| | | | | 320/109 |
| 2015/0197157 A1* | 7/2015 | Nakajima | | H01R 13/6397 |
| | | | | 439/352 |
| 2016/0087375 A1* | 3/2016 | Yoshizawa | | B60K 15/05 |
| | | | | 439/345 |
| 2017/0361761 A1* | 12/2017 | Salter | | B60K 15/00 |
| 2018/0287287 A1* | 10/2018 | Buttolo | | H01R 24/64 |
| 2019/0368240 A1* | 12/2019 | Stack | | E05C 19/022 |
| 2019/0381905 A1* | 12/2019 | Winkler | | H01R 13/7175 |
| 2020/0055389 A1* | 2/2020 | Herzig | | B60K 15/05 |
| 2020/0101852 A1* | 4/2020 | Hatami | | B60L 53/16 |
| 2020/0101853 A1* | 4/2020 | Nakanishi | | B60L 53/16 |
| 2020/0101854 A1* | 4/2020 | Nakanishi | | B62D 25/12 |
| 2020/0102018 A1* | 4/2020 | Nakanishi | | B60K 1/00 |
| 2020/0105074 A1* | 4/2020 | Fukuda | | B60K 15/05 |
| 2020/0298717 A1* | 9/2020 | Herold | | H01R 13/5202 |
| 2020/0307400 A1* | 10/2020 | de Chazal | | H01R 13/005 |
| 2020/0324646 A1* | 10/2020 | Herczeg | | B60L 53/16 |
| 2021/0016670 A1* | 1/2021 | Yamanouchi | | H01R 13/447 |

FOREIGN PATENT DOCUMENTS

| | | |
|---|---|---|
| JP | 2000280765 A | 10/2000 |
| JP | 2014050193 A | 3/2014 |
| JP | 2014112997 A | 6/2014 |
| JP | 2018043744 A | 3/2018 |

* cited by examiner

VEHICLE BODY FRONT STRUCTURE

TECHNICAL FIELD

The present invention relates to a vehicle body front structure having a port device which may include a charging port, a power feeding port and/or a fuel port, for instance.

BACKGROUND ART

A known front body structure of a vehicle includes a port device for supplying and feeding fuel or electric power to and from the vehicle. See JP2014-112997A, for instance. The vehicle body front structure disclosed in JP2014-112997A includes a front hood formed with a port opening, a lid member for selectively closing the port opening, and a charging port (port device) that can be accessed from outside via the port opening.

To allow the position of the charging port to be readily recognizable to a user, an illumination lamp may be provided adjacent to the charging port. In such a case, it is preferable that the lid is made of light transmitting material so that the user may be able to recognize the position of the charging port even when the lid is closed. However, when a lid is made of light transmitting material such as plastic and glass which is substantially lower in mechanical strength that sheet metal, the lid may be undesirably vulnerable to external impacts.

SUMMARY OF THE INVENTION

In view of such a problem of the prior art, a primary object of the present invention is to provide a vehicle body front structure provided with a port device and a lid that selectively exposes the port device, in which the lid includes a light transmitting part and is resistant to deformation under an impact load.

To achieve such an object, one embodiment of the present invention provides a vehicle body front structure (1), comprising: a housing (36) receiving a port device (30) therein and having an open side facing outward of a vehicle body (3); and a lid (58) configured to selectively close the open side of the housing; wherein the lid includes a lid plate (59) including a light transmitting base material (59C), and a reinforcing member (60) attached to an inner surface of the lid plate, the reinforcing member extending along an intermediate part of the lid plate with respect to a fore and aft direction of the vehicle body.

Thus, since the stiffness of the lid is enhanced by the reinforcing member, the lid can be made resistant to deformation. Particularly, since the reinforcing member extends along an intermediate part of the lid plate with respect to a fore and aft direction of the vehicle body, the lid can be made highly resistant to deformation.

Preferably, the lid plate includes a light transmitting portion (59A) and an opaque portion (59B), and the reinforcing member is attached to the opaque portion of the lid plate.

Thus, at least a part of the lid plate can be provided with a light transmitting property. By providing the light transmitting portion in the lid, information may be transmitted to the outside of the vehicle by providing a light emitter in the housing and allowing the emitted light to pass through the light transmitting portion. By attaching the reinforcing member to the opaque portion of the lid plate, the reinforcing member can be concealed from external view, and the external appearance of the front part of the vehicle can be enhanced.

Preferably, the lid plate (59) has a bulging portion (65) providing an outwardly convex profile, and the reinforcing member is attached to the bulging portion.

Owing to the convex profile of the bulging portion, the lid is made more resistant to deformation. In particular, by the combined effect of the convex profile and the reinforcing member, the lid can be made highly resistant to deformation against external forces.

Preferably, a port opening is provided in a front hood (7) of the vehicle body.

Thereby, the port device is positioned in a relatively front part of the vehicle body so that the access to the port device can be facilitated.

Preferably, the reinforcing member comprises a strip of material extending laterally on the inner surface of the lid plate, the reinforcing member being configured in such a manner that lateral ends of the reinforcing member are supported by corresponding parts of the housing when the lid is in a closed position.

When the lid is in the closed position, the lid plate is supported by the housing or the vehicle body via the lateral ends of the reinforcing member and the hinge arms. Thereby, the stiffness of the lid against an external force can be increased by causing the lateral ends of the reinforcing member to be supported by the corresponding parts of the housing when the lid is in the closed position.

Preferably, a pair of hinge arms (61) extend from either lateral end of the reinforcing member into the housing to be rotatably supported by the housing at free ends of the hinge arms.

Thereby, the lid can be supported by the housing via the hinge arms in a stable manner.

Preferably, each hinge arm is provided with a frangible portion (82).

Thereby, when a destructive load is applied to the lid, the hinge arms are deformed preferentially at the frangible portions so that the load can be absorbed, and the other parts of the lid and the associated parts are prevented from being destroyed or damaged.

Preferably, a first shock absorbing member (84A) is interposed between each lateral end of the reinforcing member and an opposing part of the inner surface of the lid plate.

The first shock absorbing member prevents transmission of load between each lateral end of the reinforcing member and the lid so that the deformation of the lid can be avoided.

Preferably, the vehicle body front structure further comprises a seal member (64) fitted on an outer periphery of the lid plate, wherein the seal member includes a main portion (64C) extending along the outer periphery of the lid plate, and a pair of first extensions (84) extending from the main portion along the inner surface of the lid plate, a free end part of each first extension forming the first shock absorbing member.

Thereby, a part of the seal member serves as the first shock absorbing members so that the manufacturing cost can be reduced, and the assembly process is simplified.

Preferably, the reinforcing member is bonded to the inner surface of the lid plate.

Thereby, the reinforcing member can be attached to the lid without requiring a hole or a dent to be formed in the lid so that the mechanical properties of the lid are not compromised, and a favorable external appearance of the lid can be ensured.

Preferably, an engaged member (63) is attached to the inner surface of the lid plate via a bracket (62), and a corresponding engaging member (96) configured to cooperate with the engaged member is attached to a corresponding position of the vehicle body, the bracket including a pair of side walls (62B) attached to the inner surface of the lid plate at base ends thereof and facing in a lateral direction in a mutually spaced apart relationship, and a bottom wall (62A) connected between free ends of the side walls, the engaged member being fixed to the bottom wall.

Thereby, when the engaged member is subjected to an external loading directed to the lid, the side walls of the bracket are deformed so that the load applied to the engaged member is prevented from being transmitted to the lid, and the deformation of the lid can be avoided.

Preferably, the bracket is bonded to the lid plate.

Thereby, the bracket can be attached to the lid plate without requiring a hole or a dent to be formed in the lid plate, and the mechanical properties of the lid plate are not compromised. Also, creation of an undesired light transmitting portion can be avoided.

Preferably, the base ends of the side walls are provided with flanges (62C) extending away from each other, and at least partly bonded to the inner surface of the lid plate, and a second shock absorbing member (85A) is interposed between each flange and the inner surface of the lid plate.

Thereby, when an impact is transmitted from the engagement member to the bracket, the energy of the impact can be absorbed by the second shock absorbing member so that the transmission of the impact from the bracket to the lid can be reduced, and the deformation of the lid can be avoided.

Preferably, the vehicle body front structure further comprises a seal member (64) fitted on an outer periphery of the lid plate, wherein the seal member includes a main portion (64C) extending along the outer periphery of the lid plate, and a second extension (85) extending from the main portion along the inner surface of the lid plate, and the second shock absorbing member is formed by a free end part of the second extension.

Thereby, a part of the seal member serves as the second shock absorbing member so that the manufacturing cost can be reduced, and the assembly process is simplified.

Preferably, the bracket is attached to the opaque portion of the lid.

Thereby, the bracket is concealed from view when the lid is in the closed position so that the external appearance of the vehicle can be enhanced.

Preferably, the reinforcing member and the bracket are formed integrally.

Thereby, the positioning of the reinforcing member and the bracket is facilitated when attaching the reinforcing member and the bracket to the lower surface of the lid. Also, the manufacturing cost can be reduced, and the assembly process can be simplified.

Preferably, the housing is supported by the vehicle body via a support member (42, 43), and the support member is provided with a frangible portion (42C, 43C).

Thereby, when an impact is applied to the housing, the energy of the impact can be absorbed by the deformation of the frangible portion so that the deformation or dislocation of the housing can be avoided. As a result, the port device received in the housing can be prevented from being undesirably exposed, and can be protected from damages.

The present invention thus provides a vehicle body front structure provided with a port device and a lid that selectively exposes the port device, in which the lid includes a light transmitting part and is resistant to deformation under an impact load.

BRIEF DESCRIPTION OF THE DRAWING(S)

Figure 2:
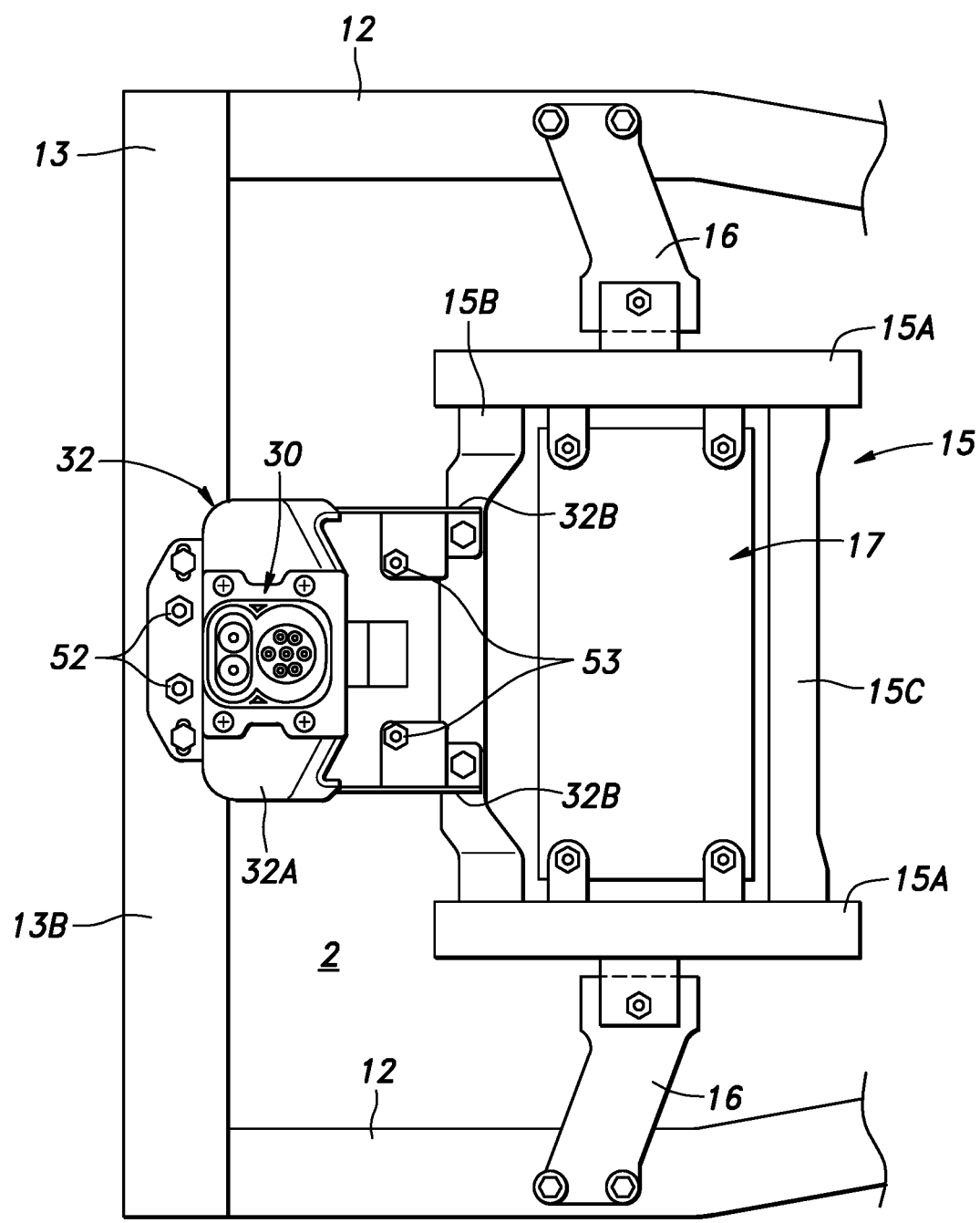
Figure 3:
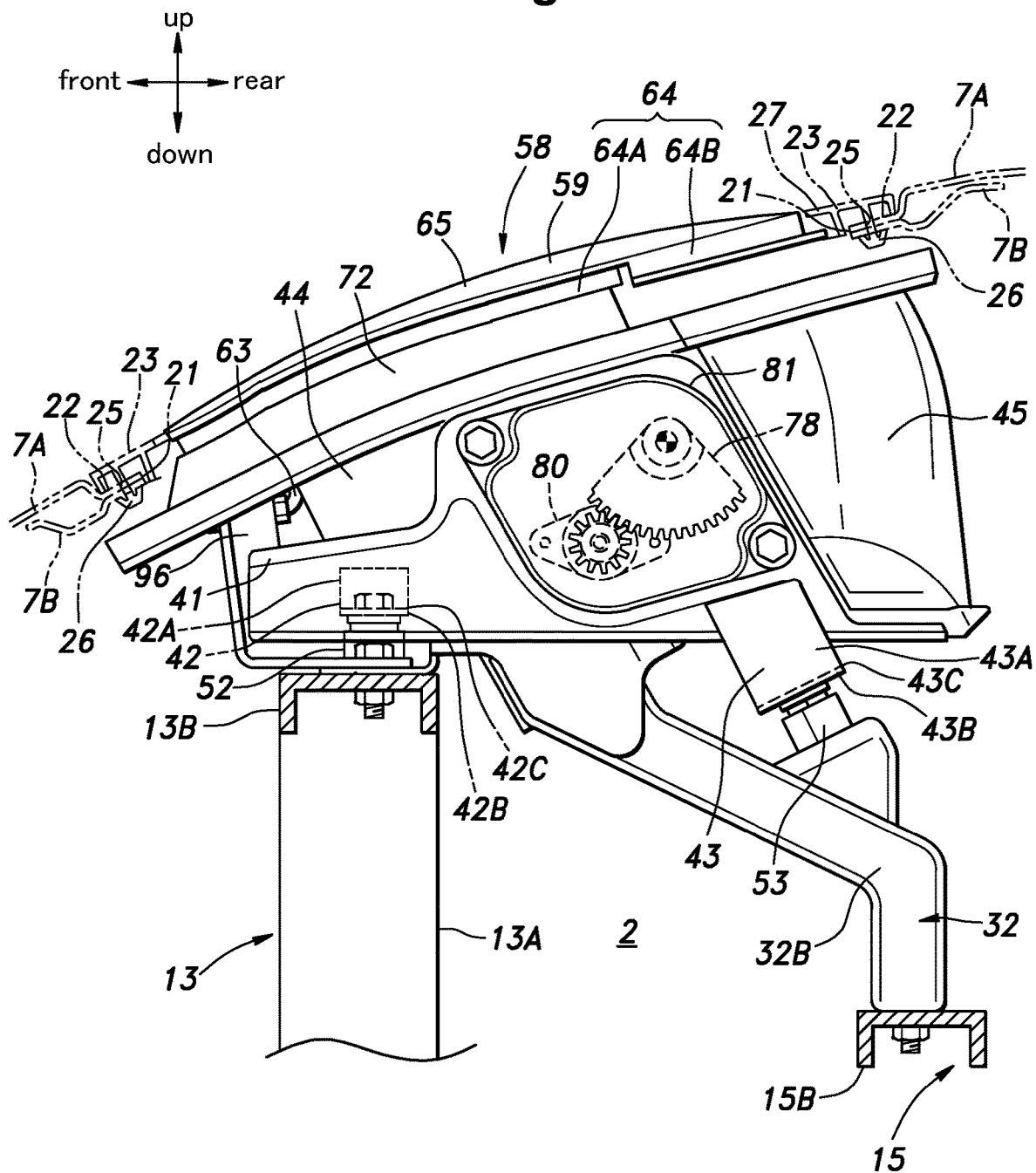
Figure 4:
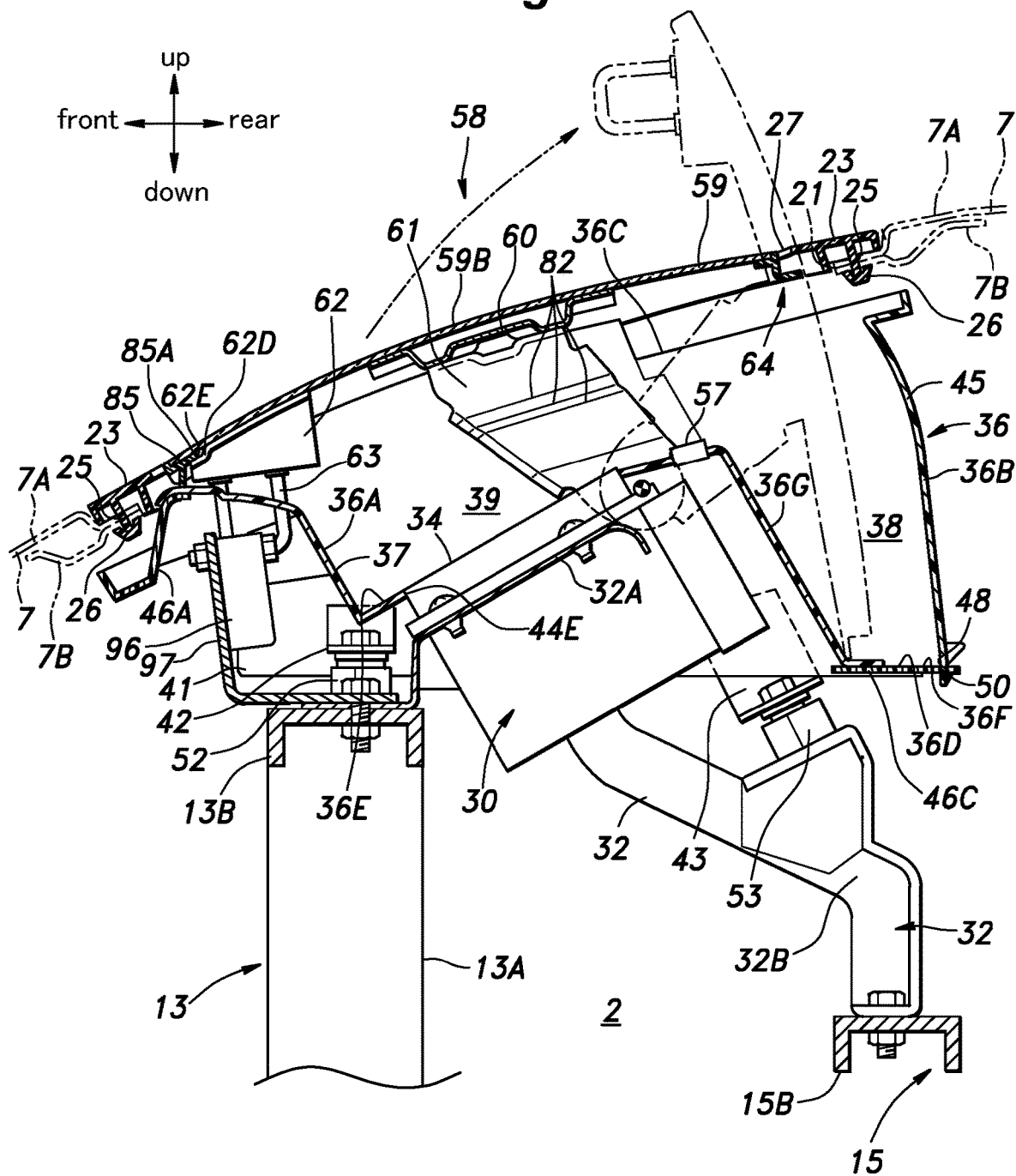
Figure 5:
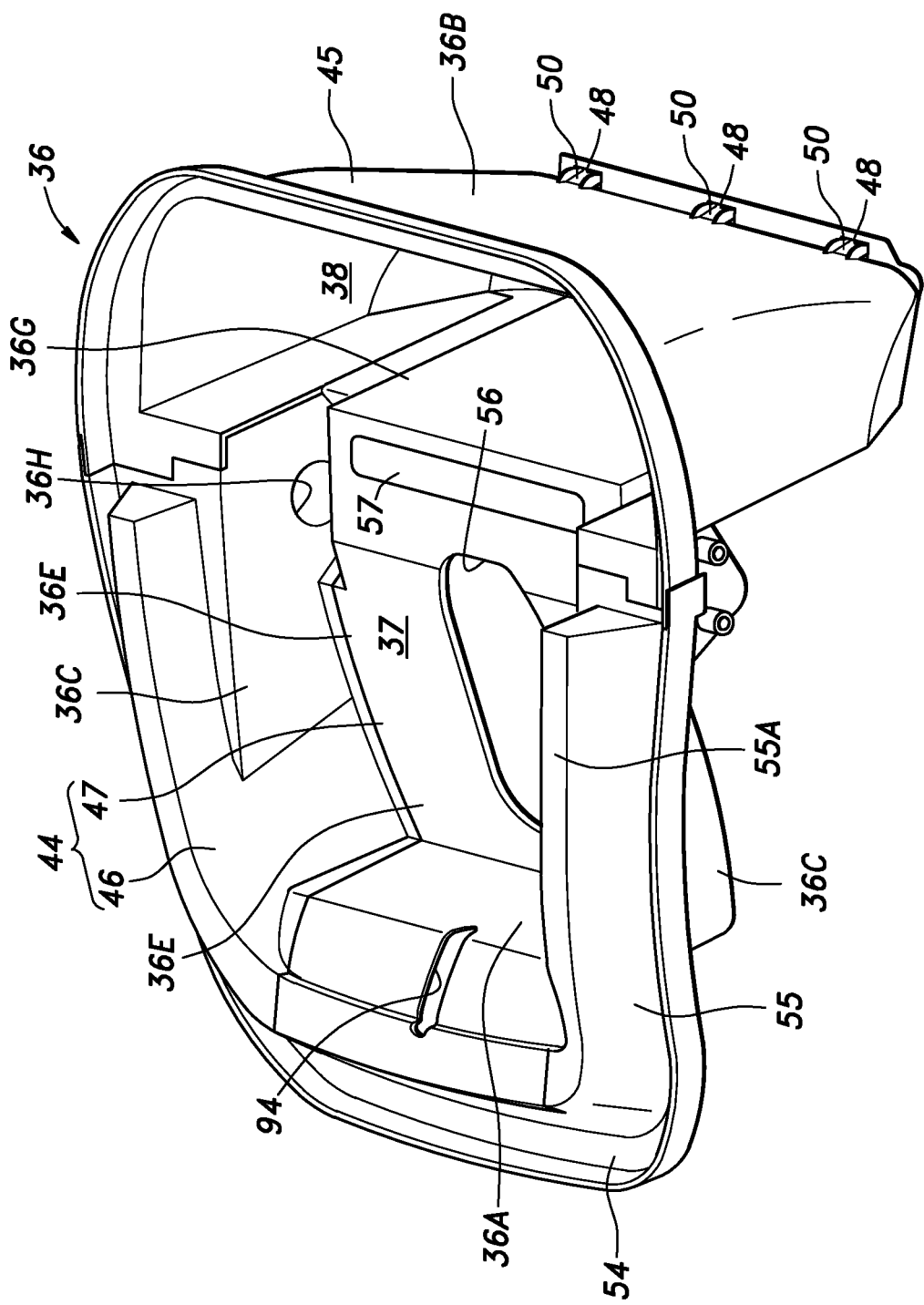
Figure 6:
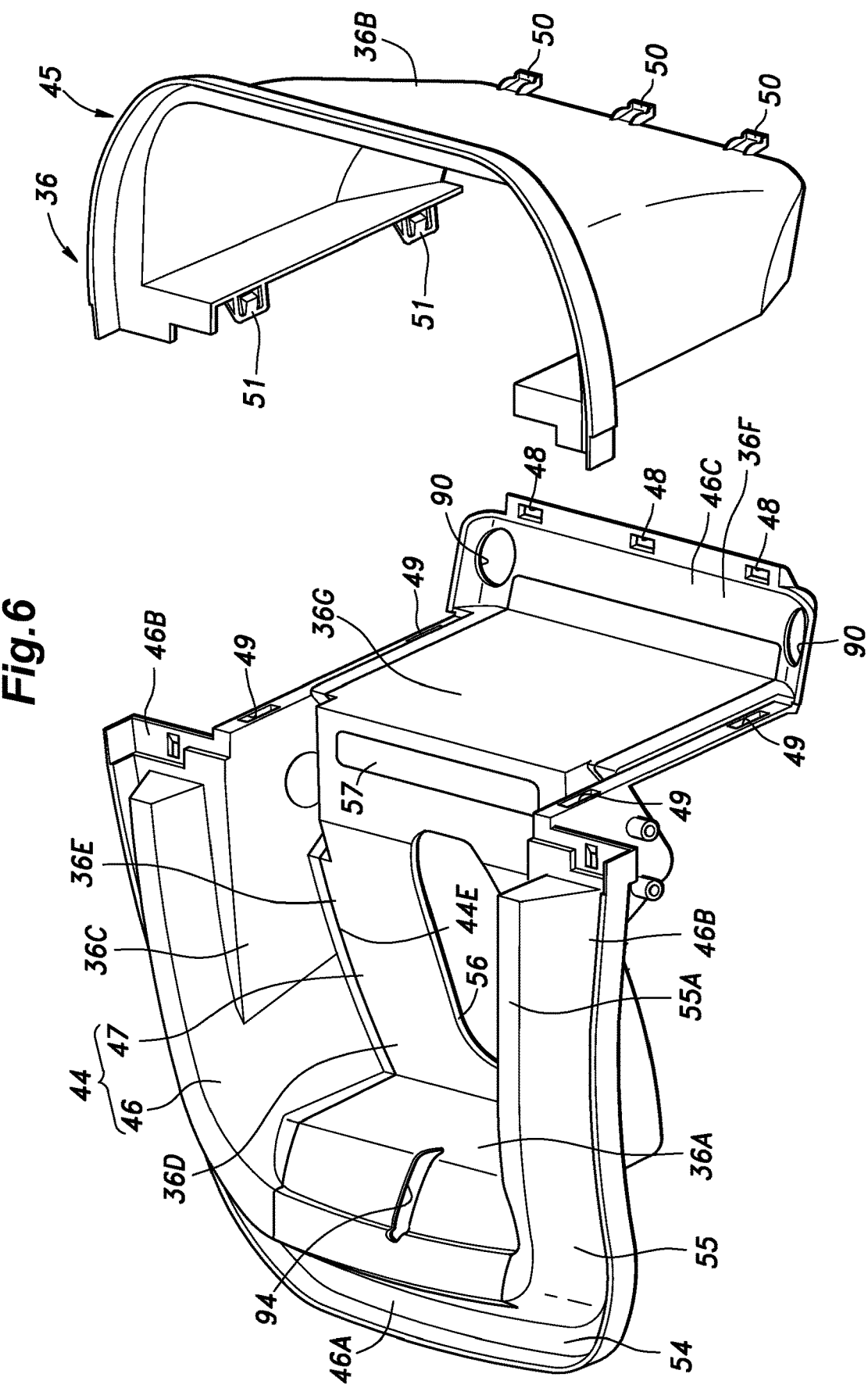
Figure 7:
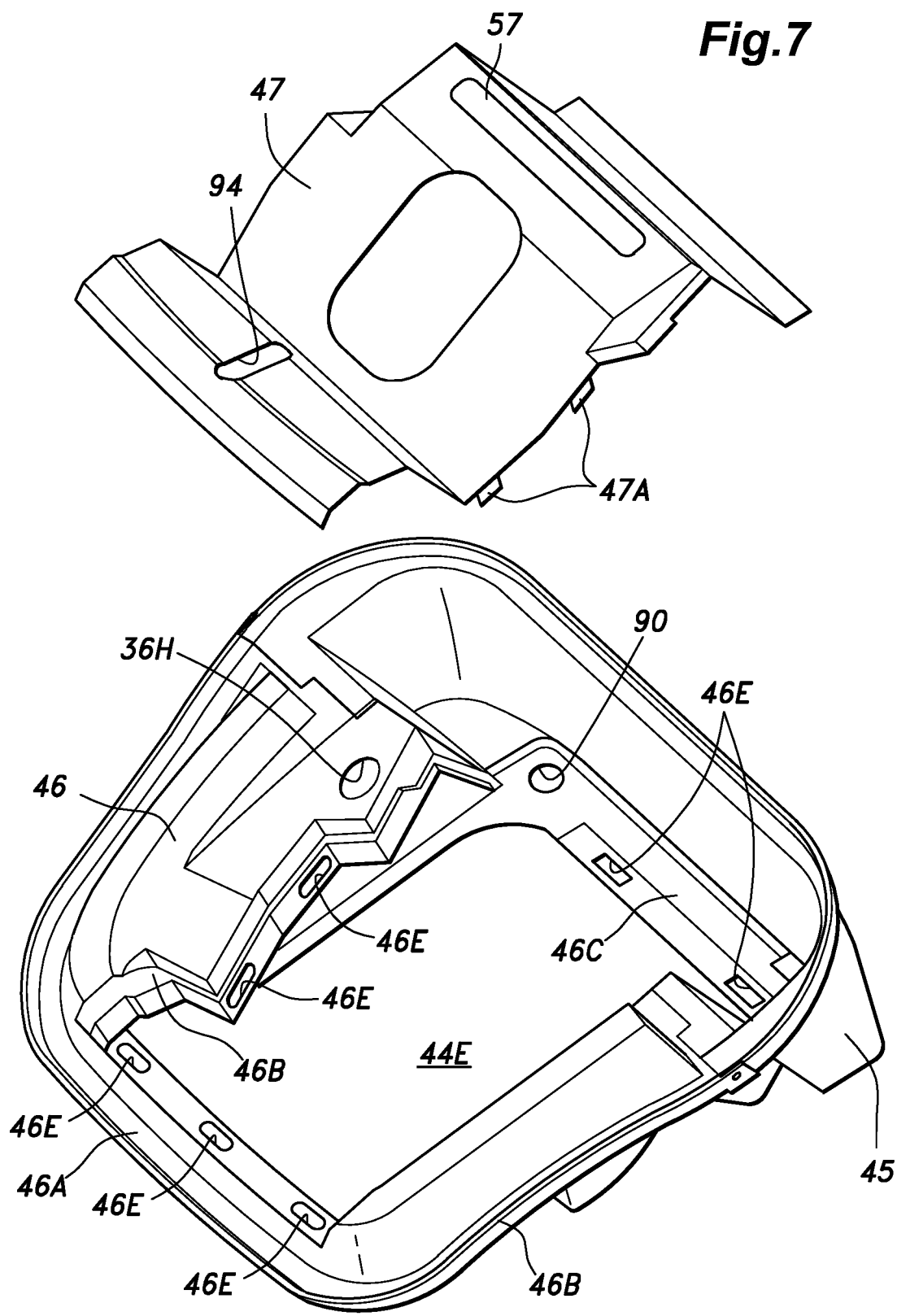
Figure 8:
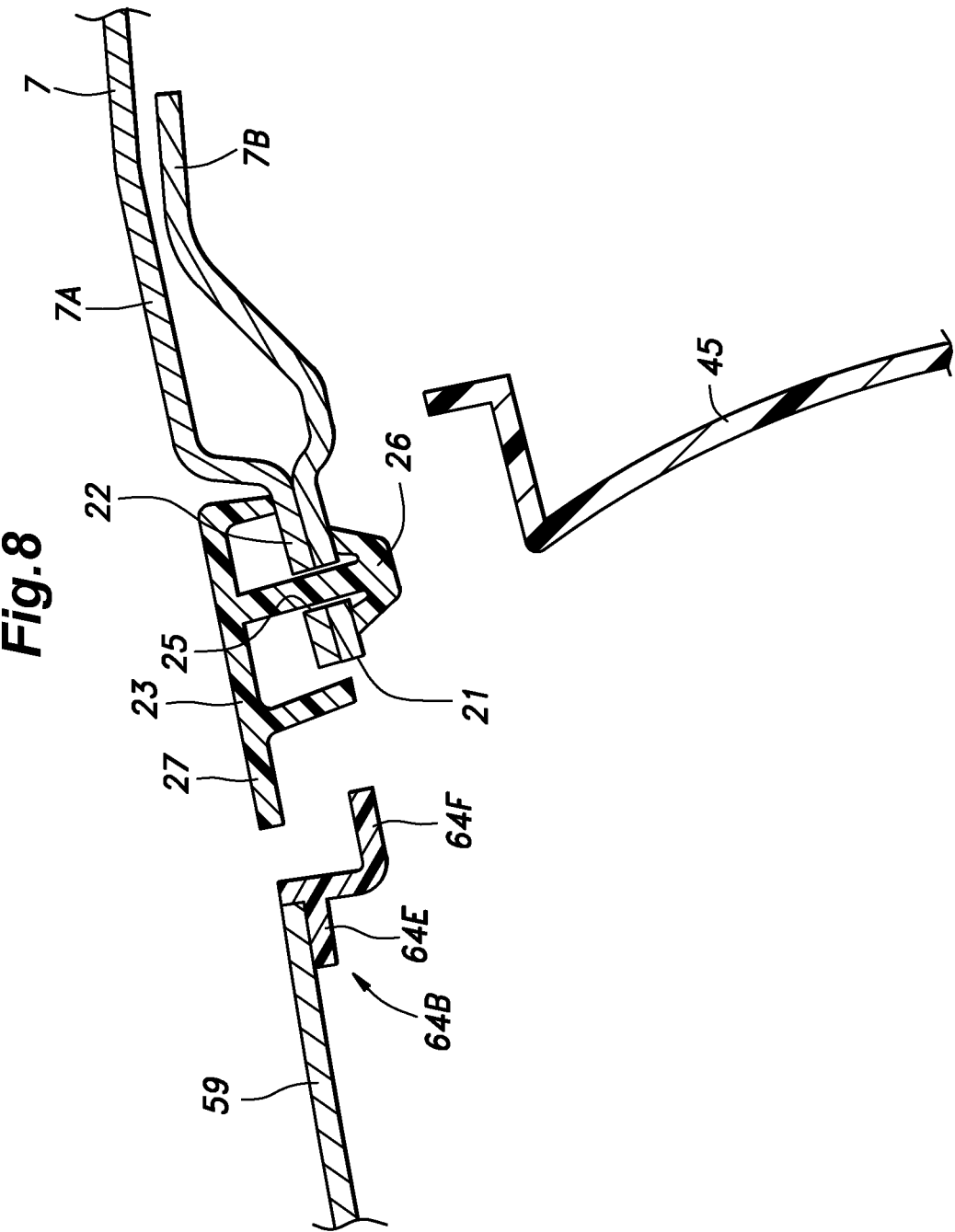
Figure 9:
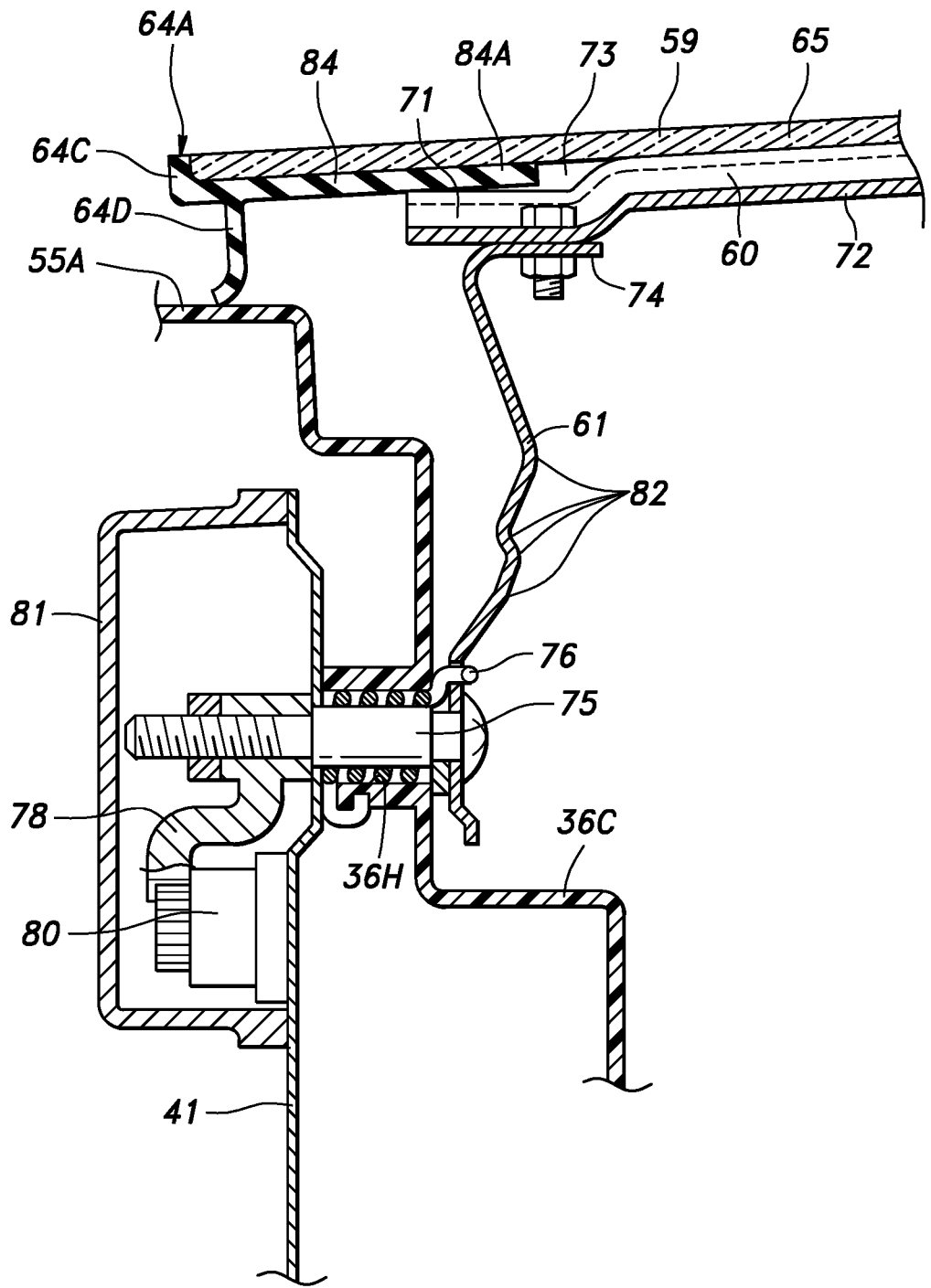
Figure 11:
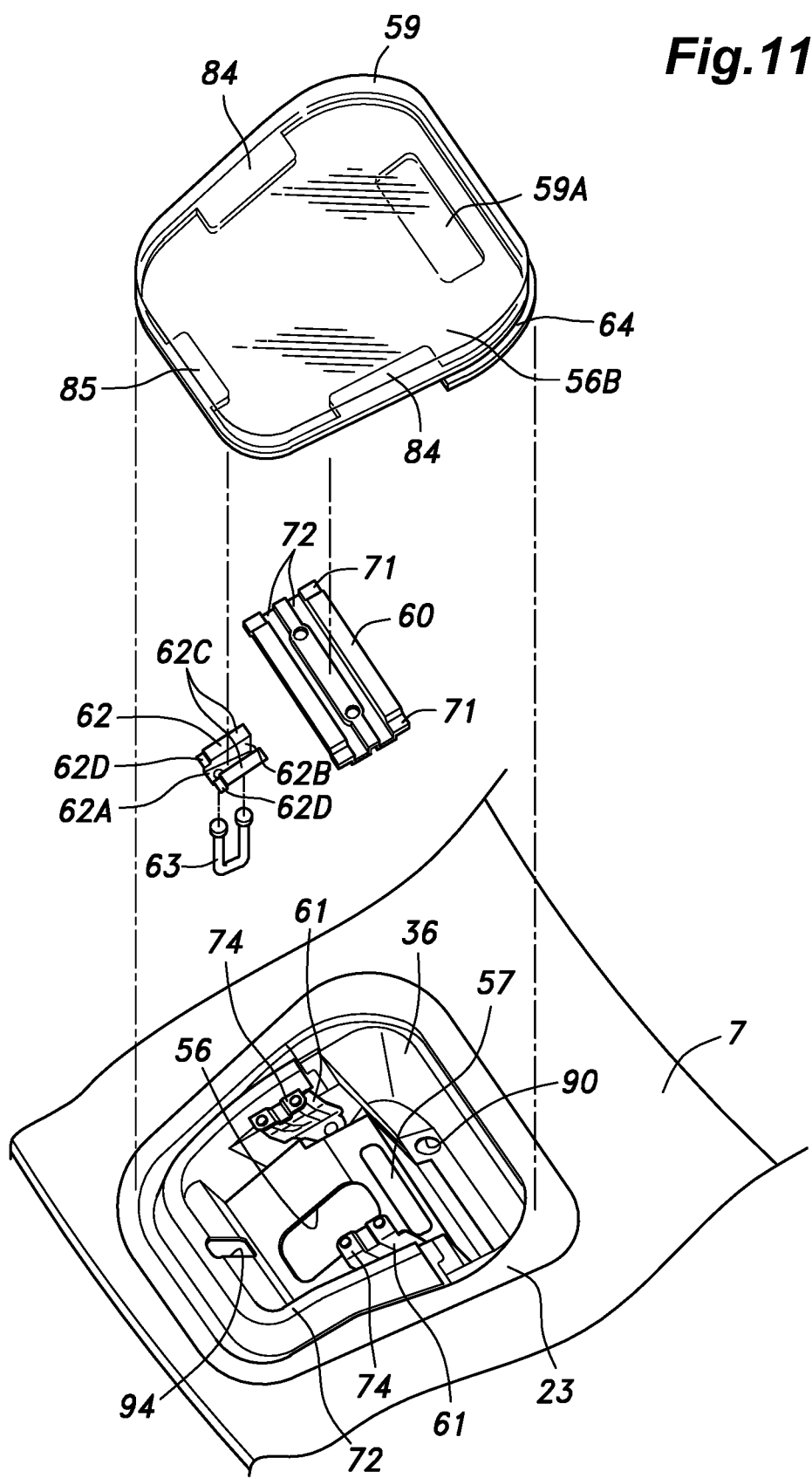
Figure 12:
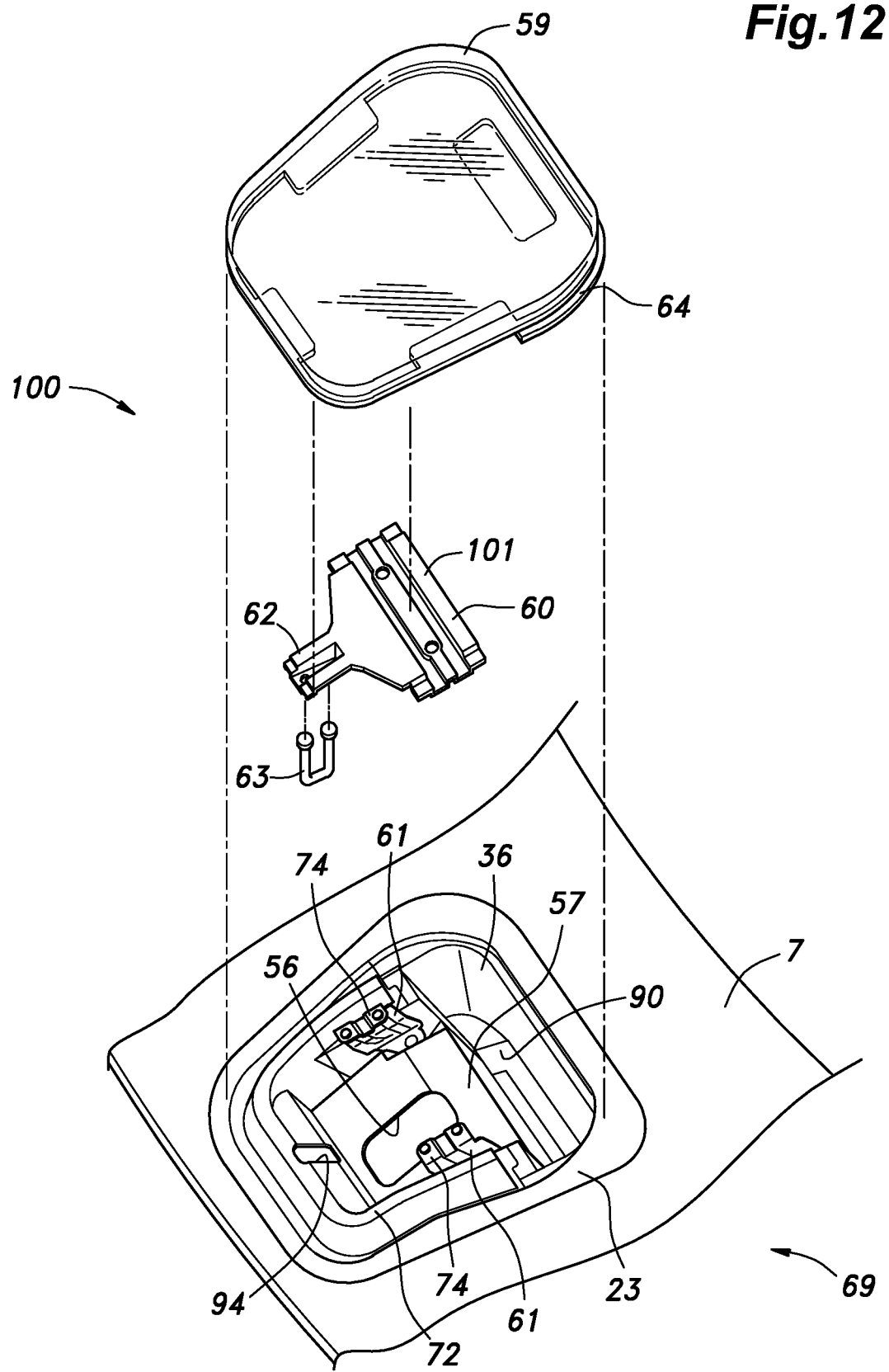

FIG. 1 is a perspective view of a vehicle body front structure according to an embodiment of the present invention showing a lid in a closed position in (A) and in an open position in (B);
FIG. 2 is a plan view of the vehicle body front structure;
FIG. 3 is a side view of the vehicle body front structure;
FIG. 4 is a sectional view taken along line IV-IV in FIG. 1;
FIG. 5 is a perspective view of a housing of a port device;
FIG. 6 is an exploded perspective view of the housing consisting of a front housing member and a rear housing member;
FIG. 7 is an exploded perspective view of the front housing member consisting of a first member and a second member;
FIG. 8 is an enlarged fragmentary sectional view of a rear part of the housing;
FIG. 9 is a sectional view taken along line IX-IX in FIG. 1;
FIG. 10A is an exploded perspective view of the lid and an associated seal member; FIG. 10B is a sectional view taken along line XB-XB in FIG. 10A,
FIG. 11 is an exploded perspective view of the lid and the housing; and
FIG. 12 is a view similar to FIG. 11 showing an alternate embodiment of the present invention.

DESCRIPTION OF THE PREFERRED EMBODIMENT(S)

A vehicle body front structure according to an embodiment of the present invention is described in the following. The vehicle to which the vehicle body front structure of this embodiment is applied may be an electric vehicle or a plug-in hybrid vehicle.

As shown in FIG. 1, the vehicle body front structure 1 is a part of a vehicle body 3 that defines a cabin and a front space 2 located in front of the cabin. The vehicle body 3 includes a pair of fenders 4 that define the left and right sides of the front space 2, a front bumper face 5 and a front grille 6 that define the front end of the front space 2, a dashboard panel (not shown in the drawings) that separates the rear end of the front space 2 and the front end of the cabin from each other, and an under cover (not shown in the drawings) that delimits the lower end of the front space 2. The upper opening of the front space 2 can be selectively closed by a front hood 7.

The front hood 7 is connected to the dashboard panel by hinges (not shown in the drawings) at the lateral ends of the rear part thereof, and is supported by the dashboard panel so as to be rotatable about a hinge axis extending laterally. Thus, the front hood 7 can selectively close the upper open end of the front space 2. The front wheels 8 are provided on either side of the front space 2.

As shown in FIG. 2, the vehicle body 3 includes a pair of front side members 12 extending in the fore and aft direction along either side of a lower part of the front space 2, and a bulkhead 13 connected between the front ends of the front side members 12. The bulkhead 13 consists of a rectangular frame including a pair of vertical members 13A connected to the front side members 12, respectively, an upper member 13B connected between the upper ends of the vertical members 13A, and a lower member (not shown in the drawings) connected between the lower ends of the vertical members 13A. A radiator (not shown in the drawings) for cooling electric equipment is positioned under the upper member 13B.

A subframe 15 is provided between the left and right front side members 12. The subframe 15 consists of a rectangular frame facing vertically that includes a pair of longitudinal members 15A extending in the fore and aft direction, a front member 15B extending laterally between the front ends of the left and right longitudinal members 15A at the respective lateral ends thereof, and a rear member 15C extending laterally between the rear ends of the left and right longitudinal members 15A at the respective lateral ends thereof. Each longitudinal member 15A is connected to the corresponding front side member 12 via a connecting member 16 extending in the outboard direction from an intermediate point of the longitudinal member 15A. The subframe 15 is provided for supporting an electric unit 17 for charging and feeding electric power. The electric unit 17 may include an AC-DC converter. In addition, a drive motor (not shown in the drawings) for driving the front wheels 8 may be supported by the subframe 15. The drive motor may be positioned under the electric unit 17. The upper member 13B and the front member 15B extend in parallel to each other in the lateral direction. As shown in FIGS. 3 and 4, the front member 15B is positioned somewhat lower than the upper member 13B.

As shown in FIGS. 3 and 4, the front hood 7 has a plate-like outer panel 7A disposed on the outer side of the vehicle, and a plate-shaped inner panel 7B disposed on the back side of the outer panel 7A. The inner panel 7B includes parts functioning as beams to impart rigidity to the outer panel 7A by forming a closed cross section jointly with the outer panel. The peripheral edge of the outer panel 7A is attached to the peripheral edge of the inner panel 7B by hemming. It is preferable that the outer panel 7A and the inner panel 7B are further bonded in selected places by an adhesive agent or the like.

A port opening 21 is formed in a front part of the front hood 7 with respect to the fore and aft direction, and in a central part of the front hood 7 with respect to the lateral direction. The port opening 21 is substantially rectangular (or trapezoidal) in plan view. An edge part 22 of the outer panel 7A defining the port opening 21 is recessed downward or toward the inner panel 7B. The edge part 22 of the outer panel 7A is attached to the inner panel 7B at a plurality of locations by spot welding. It is preferable that each side of the rectangular edge part 22 is provided with at least one spot welded point. It is also possible to use laser welding or another form of welding that creates a weld seam between the outer panel 7A and the inner panel 7B. To increase the stiffness of the part of the front hood 7 surrounding the port opening 21, the inner panel 7B is formed with an annular bead recessed downward along the periphery of the port opening 21 so as to form a closed cross section surrounding the port opening 21 jointly with the outer panel 7A.

A garnish 23 is provided on the outer surface side of the edge part 22. The garnish 23 is made of resin. The garnish 23 has a substantially rectangular frame portion 24. The frame portion 24 is disposed along the edge part 22, and covers the outer surface and the terminal edge of the edge part 22. A plurality of engagement claws 26 project from the back side (lower side) of the garnish 23, and are passed through engagement holes 25 formed in the part of the front hood 7 corresponding to the edge part 22 to fixedly secure the garnish 23 to the front hood 7. The rear side of the garnish 23 is provided with a flange portion 27 that projects forward so as to overlap with a rear end part of the port opening 21 (or to overhang over a rear end part of the port opening 21). The garnish 23 rests upon the downwardly recessed edge part 22 of the outer panel 7A so that the upper surface of the frame portion 24 of the garnish 23 is substantially flush with the upper surface of the front hood 7.

A port device 30 is supported by the vehicle body 3 so as to be located under the front hood 7. More specifically, the port device 30 is supported by a support member 32 which is fixed to the upper member 13B and the front member 15B in such a manner that the port device 30 faces the port opening 21. The support member 32 that forms a part of the vehicle body 3 is formed by combining a plurality of sheet metal members. The support member 32 includes a main portion 32A fixed to the upper member 13B at the front edge thereof, and a pair of leg portions 32B extending rearward and downward from either lateral end part of the main portion 32A. The rear ends of the leg portions 32B are fixed to the front member 15B. The main portion 32A is formed in a plate shape and is inclined so that the upper surface faces forward and upward. The main portion 32A is connected to the upper member 13B at the front edge thereof.

The port device 30 includes a port 34 (connector) that is electrically connected to the electric unit 17 by an internal cable, and an external cable can be detachably connected to the port 34. The port 34 may include at least one of a charging port and a power feeding port. The port 34 may include a single port used for charging an onboard battery and feeding electric power to an external user, or may include a charging port and a power feeding port that are provided independently from each other. The port device 30 is provided on the upper surface of the main portion 32A of the support member 32 so as to face forward and upward.

The port device 30 is received in a housing 36 that has a front wall 36A, a rear wall 36B, a left and a right side wall 36C, and a bottom wall 36D, and is thus formed in a box shape having an open top side. The housing 36 in the illustrated embodiment is made of a plurality of pieces of molded plastic as will be discussed in more detail hereinafter. The bottom wall 36D includes a front bottom wall 36E, a rear bottom wall 36F positioned lower than the front bottom wall 36E, and a vertical wall 36G positioned between the front bottom wall 36E and the rear bottom wall 36F and facing generally rearward. The rear wall 36B is connected to the rear bottom wall 36F at the rear edge thereof, and the left and right side walls 36C are connected to the rear bottom wall 36F and the vertical wall 36G at the respective lower edges thereof. The front bottom wall 36E, the rear wall 36B, and the left and right side walls 36C jointly define a port accommodating space 37 which is formed as a recess having an open top side. The rear bottom wall 36F, the vertical wall 36G, the rear wall 36B, and the left and right side walls 36C jointly define a lid receiving recess 38 formed as a recess having an open top side. The upper part of the lid receiving recess 38 is continuous with the bottom portion of the port accommodating space 37.

As shown in FIG. 3, a side plate 41 made of sheet metal is attached to the outer surface of each side wall 36C of the housing 36 in an overlying relationship, and is fastened to the side wall 36C by screws or the like. A lower edge part of a front end of each side plate 41 is connected to a first support member 42, and a lower edge part of a rear end of each side plate 41 is connected to a second support member 43. Each first support member 42 is made of sheet metal, and includes a vertical piece 42A extending vertically downward from the side plate 41, and a lateral piece 42B extending from the lower end of the vertical piece 42A in the inboard direction. There is a substantially 90 degree angle bend 42C between the vertical piece 42A and the lateral piece 42B. Each second support member 43 is also made of sheet metal, and includes a vertical piece 43A extending vertically downward from the side plate 41, and a lateral piece 43B extending from the lower end of the vertical piece 43A in the inboard direction. There is a substantially 90 degree angle bend 43C between the vertical piece 43A and the lateral piece 43B. The lateral piece 42B of each first support member 42, and the lateral piece 43B of each second support member 43 overlap with the housing in plan view or extend in the inboard direction under the housing 36.

The first support members 42 and the second support members 43 are each configured to bend and deform at the bend 42C, 43C under a downward loading in such a manner that these bends 42C and 43C form frangible parts or parts that deform in a preferential manner under a destructive loading.

As best shown in FIG. 6, the housing 36 includes a front housing member 44 that forms a front part of the housing 36, and a rear housing member 45 that is detachably connected to the rear end of the front housing member 44 and forms a rear part of the housing 36. The front housing member 44 provides the front wall 36A of the housing 36, front parts of the left and right side walls 36C, and the bottom wall 36D (the front bottom wall 36E, the vertical wall 36G, and the rear bottom wall 36F). The rear housing member 45 provides the rear wall 36B and rear parts of the left and right side walls 36C.

As best shown in FIG. 7, the front housing member 44 includes a first member 46 and a second member 47 that are detachably connected to each other. The first member 46 includes a front edge portion 46A extending laterally, a pair of side edge portions 46B extending rearward from the respective side ends of the front edge portion 46A, and a rear edge portion 46C connected to the rear ends of the side edge portions 46B. The front housing member 44 is thus provided with a rectangular frame shape, and forms a peripheral part of the front housing member 44. The front edge portion 46A, the left and right side edge portions 46B, and the rear edge portion 46C jointly defines a front housing opening 44E. The second member 47 is disposed inside the first member 46 so as to close the front housing opening 44E. The first member 46 thus forms a front part of the front wall 36A, front parts of the left and right side walls 36C, lateral side edge parts 46B of the front bottom wall 36E, lateral side edge parts 46B of the vertical wall 36G, and a rear part of the rear bottom wall 36F. The second member 47 forms a rear part of the front wall 36A, a laterally central part of the front bottom wall 36E, a laterally central part of the vertical wall 36G, and a front part of the rear bottom wall 36F.

A plurality of connecting holes 46E are formed in an inner peripheral part of the first member 46, and connecting claws 47A are formed in the outer peripheral part of the second member 47 so as to be detachably connected to the corresponding connecting holes 46E.

The rear bottom wall 36F formed by the first member 46 is provided with first engagement holes 48 in the rear edge thereof. Each side edge of the vertical wall 36G of the first member 46 is provided with second engagement holes 49. The rear wall 36B of the rear housing member 45 is provided with engagement pieces 50 in the lower edge thereof so as to correspond to the first engagement holes 48. The first engagement pieces 50 are each formed in a hook shape that is configured to be hooked on the edge of the corresponding first engagement hole 48. The front end of the rear part of each side wall 36C formed by the rear housing member 45 is provided with second engagement pieces 51 detachably connected to the corresponding second engagement holes 49.

In a state where the second member 47 is detached from the first member 46, the lateral pieces 42B of the first support members 42 and the lateral pieces 43B of the second support members 43 are exposed upward through the front housing opening 44E.

A front part of the front housing member 44 defines the port accommodating space 37. A rear part of the front housing member 44 and the rear housing member 45 jointly define the lid receiving recess 38. By releasing the engagement between the second engagement holes 49 and the second engagement pieces 51, the rear housing member 45 can be separated rearward from the front housing member 44, and the lid receiving recess 38 can be exposed. At this time, the first engagement pieces 50 are kept engaged by the first engagement holes 48 so that the rear housing member 45 can be rotated with respect to the front housing member 44 around the first engagement pieces 50.

As shown in FIGS. 3 and 4, a pair of left and right front adjustment nuts 52 are provided on the front edge of the main portion 32A of the support member 32, and a pair of left and right rear adjustment nuts 53 are provided on the left and right leg portions 32B of the support member 32, respectively. The lateral pieces 42B of the left and right first support members 42 are fastened to the corresponding front adjustment nuts 52 by bolts. Further, the lateral pieces 43B of the left and right second support members 43 are fastened to the corresponding rear adjustment nuts 53 by bolts. The height of the front adjustment nut 52 and the rear adjustment nut 53 can be changed in the axial direction by the rotation of the corresponding bolts that are threaded with the corresponding adjustment nuts 52 and 53. The height and the inclination angle of the housing 36 can be thus adjusted by means of the front adjustment nuts 52 and the rear adjustment nuts 53. With the second member 47 removed from the first member 46, the first support members 42 and the second support members 43 become accessible from above so that the first support members 42 and the second support members 43 can be fastened to the front adjustment nut 52 and the rear adjustment nut 53, and can be adjusted as required via the front housing opening 44E. Once the second member 47 is attached to the first member 46, the various mounting components such as the first support members 42, the second support members 43, the front adjustment nuts 52, and the rear adjustment nuts 53 can be concealed from view.

As shown in FIG. 5, the housing 36 is provided with a flange 54 that extends outward from the upper edge of the front wall 36A, the rear wall 36B, and the side walls 36C. The flange 54 is formed as a substantially horizontal plate, and has a substantially rectangular frame shape in plan view. The flange 54 is provided with a rib 55 protruding upward. The rib 55 extends laterally along the front wall 36A, and extends rearward from the lateral ends thereof along the respective side walls 36C. A substantially horizontal contact surface 55A is defined on the upper end surface of the rib 55.

The front bottom wall 36E formed by the second member 47 is provided with an opening 56 passed vertically therethrough. The port device 30 provided in the main portion 32A of the support member 32 extends through the opening 56, and is received inside the housing 36. A light emitter 57 such as an LED is provided in the port accommodating space 37, in particular a rear end part of the front bottom wall 36E. The light emitter 57 may function as a display unit for putting out information to the outside. For instance, the light emitter 57 may serve as a welcome light or an indicator that indicates the port 34 is available for use.

As shown in FIG. 4, a lid 58 that selectively closes the port opening 21 is rotatably provided in the housing 36. As shown in FIG. 11, the lid 58 includes a lid plate 59 that opens and closes the port opening 21, a reinforcing member 60 attached to the back side of the lid plate 59, and a pair of hinge arms 61 (arm members) connected to the reinforcing member 60. A striker 63 is attached to the rear side of the lid plate 59 via a bracket 62. The striker 63 is provided in a front part of the lid 58. The lid plate 59 is provided with a seal member 64 attached to the outer periphery thereof.

As shown in FIG. 3 and FIG. 4, the lid plate 59 is formed in a substantially flat plate shape. The lid plate 59 includes a bulging portion 65 bulging on the front side at the center thereof.

As shown in FIG. 10A, the lid plate 59 is formed of a light-transmitting material such as tempered glass, laminated glass, or resin. The lid plate 59 is provided with a light transmitting portion 59A having a light transmitting property and an opaque portion 59B configured to block light. More specifically, as shown in FIG. 10B, the lid plate 59 includes a base material 59C consisting of rectangular (or trapezoidal) sheet of glass or plastic which is by itself transparent or otherwise light transmitting, and a black ceramic layer 59D deposited on the surface of the base material 59C in the part thereof corresponding to the opaque portion 59B (or the part other than the light transmitting portion 59A). Thus, the part of the base material 59C coated with the black ceramic layer 59D serves as the opaque portion 59B, and the part of the base material 59C not coated with the black ceramic layer 59D serves as the light transmitting portion 59A. Thus, the light from the light emitter 57 passes through the light transmitting portion 59A, and can reach the outside of the lid plate 59. In the illustrated embodiment, the black ceramic layer 59D is deposited on the inner surface of the base material 59C. As shown in FIG. 11, the reinforcing member 60 is made of a substantially rectangular sheet metal piece, and extends laterally along the back surface of the lid plate 59. The reinforcing member 60 is positioned in an intermediate part of the lid plate 59 with respect to the fore and aft direction, and is positioned and dimensioned so as to be entirely covered by the opaque portion 59B. The reinforcing member 60 may be bonded to the lid plate 59. The lateral ends of the reinforcing member 60 are provided with bent portions 71 that are bent downward in a stepwise fashion with respect to the central portion thereof. A gap 73 is therefore created between each bent portion 71 and the opposing part of the back surface of the lid plate 59 (FIG. 9). In order to increase rigidity, the reinforcing member 60 is provided with a plurality of ribs 72 extending in the lateral direction.

As shown in FIG. 9, the left and right hinge arms 61 are sheet metal members. Each hinge arm 61 extends vertically, and has a major plane facing laterally. The upper end of each hinge arm 61 is bent in the inboard direction so as to form a flange portion 74. Each hinge arm 61 is attached to the corresponding bent portion 71 of the reinforcing member 60 at the flange portion 74 thereof by a threaded bolt or the like. In another embodiment, the hinge arms 61 are formed as integral parts of the reinforcing member 60.

Each hinge arm 61 is disposed along the inner surface of the corresponding side wall 36C. The side walls 36C are each formed with a bearing hole 36H passed laterally therethrough. The lower end of each hinge arm 61 is connected to an end of a hinge shaft 75 rotatably supported by the bearing hole 36H so that the hinge arm 61 is pivotally supported by the housing 36 at the lower end. The two hinge shafts 75 extend laterally along a common hinge axis that forms the hinge axis of the lid 58. Thus, the lid 58 is supported by the housing 36 so as to be rotatable around the hinge axis.

As shown in FIGS. 1 and 4, the lid 58 can be pivoted around the hinge shafts 75 between a closed position (shown by solid lines in FIGS. 1 and 4) and an open position (shown by two-dot chain lines in FIGS. 1 and 4). In the closed position, the lid plate 59 is disposed substantially horizontally and closes the port opening 21.

Further, the lid plate 59 is disposed so as to have an outer surface flush with the outer surface of the garnish 23 of the front hood 7. In the open position, the lid plate 59 is positioned rearward of the hinge shafts 75, and is disposed substantially vertically to expose the port opening 21. When the lid 58 moves from the closed position to the open position, the lid plate 59 rotates backward about the hinge shafts 75. More specifically, when viewed from the left side of the vehicle body 3, the lid plate 59 rotates clockwise around the hinge shafts 75. In the open position, a large part of the lid plate 59 is accommodated in the lid receiving recess 38, and a part thereof protrudes above the front hood 7.

As shown in FIG. 9, a biasing member 76 that biases the lid 58 to the open position is provided between each hinge arm 61 and the corresponding side wall 36C. A per se known rotary damper 80 is provided on the outer surface of the side plate 41. A gear 78 fixed to the outboard end of each hinge shaft 75 meshes with a gear fixed to the rotary shaft of the rotary damper 80. The gear 78 fixed to the hinge shaft 75 may be a sector gear, for example. The rotary damper 80 dampens the rotational movement of the hinge shaft 75. A cover 81 is attached to the outer surface of the side plate 41 to cover the outer end of the hinge shaft 75, the gear 78, and the rotary damper 80.

As shown in FIGS. 4 and 9, a frangible portion 82 is provided in a middle portion of each hinge arm 61 with respect to the lengthwise direction thereof. In this embodiment, the frangible portion 82 is a bent portion that is formed by bending the hinge arm 61 laterally in a stepwise fashion. In an alternate embodiment, the frangible portion 82 may be a portion of the hinge arm 61 that is thinner or narrower than the remaining part of the hinge arm 61. Further, the frangible portion 82 may have at least one lightening hole. The frangible portion 82 is configured to preferentially deform so as to absorb the energy of a destructive loading that may be applied to the lid plate 59 from outside.

As shown in FIG. 11, the bracket 62 is connected to the back surface of the lid plate 59 in front of the reinforcing member 60. The bracket 62 is a sheet metal member, and includes a substantially horizontal bottom wall 62A which is elongated in the fore and aft direction, a pair of side walls 62B extending upward from the outboard edges of the bottom wall 62A, and a pair of flanges 62C extending away from each other from the upper edges of the respective side walls 62B. The bracket 62 thus has a hat shape when viewed from the front. The bracket 62 is attached to the back surface of the lid plate 59 at the flanges 62C. The front part of the each flange 62C is provided with a bent portion 62D that is bent downward in a stepwise fashion with respect to the rear part thereof. A gap 62E is thus created between each bent portion 62D and the back surface of the lid plate 59. The striker 63 is connected to the bottom wall 62A, and protrudes downward from the bottom wall 62A.

Figure 10:
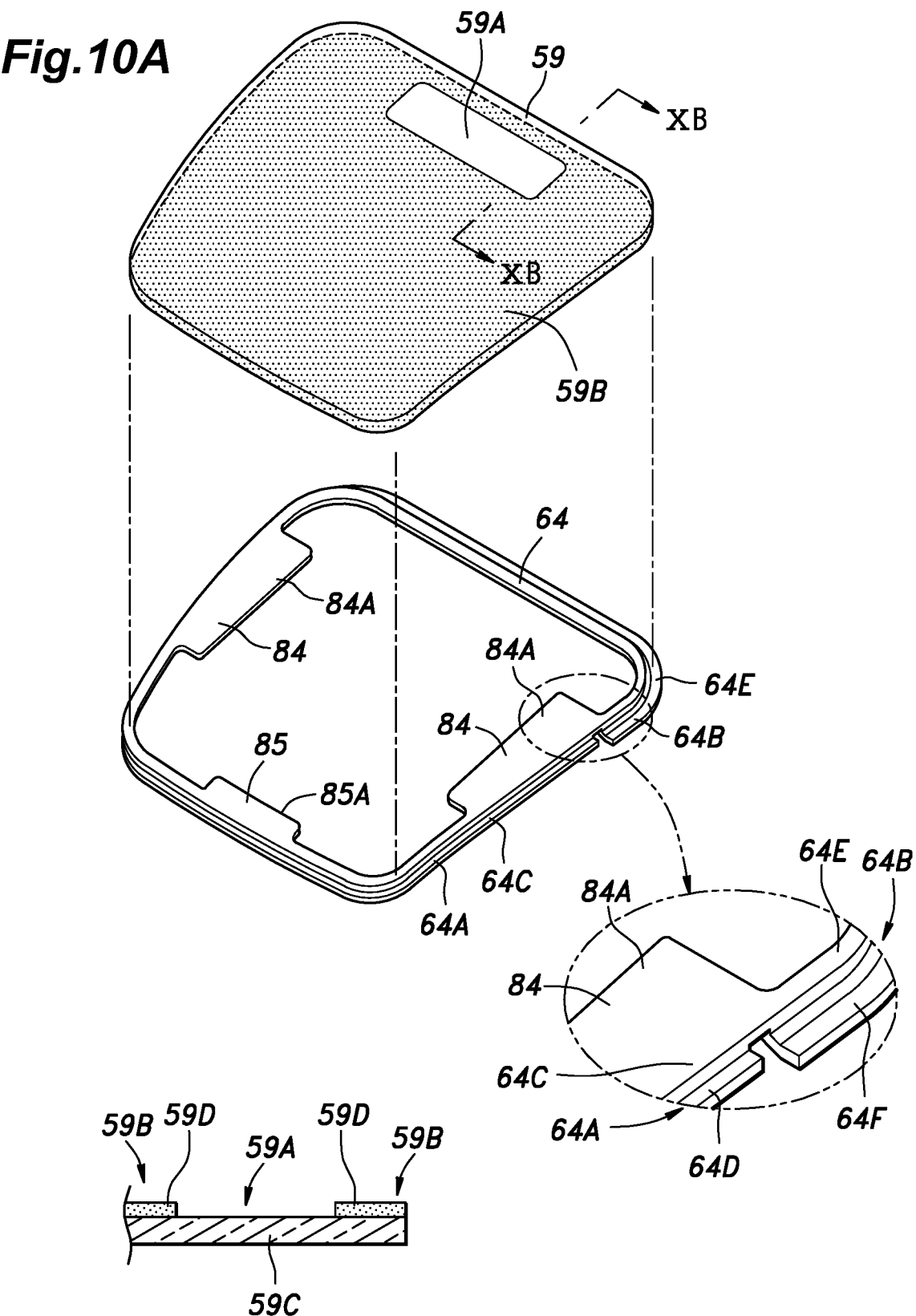

As best shown in FIG. 10, the seal member 64 is made of a flexible material such as rubber and elastomer, and includes a first seal portion 64A extending along the front edge and the side edges of the lid plate 59, and a second seal portion 64B extending along the rear edge of the lid plate 59. The first seal portion 64A has a main portion 64C that extends along the front edge and the left and right side edges of the lid plate 59, and is bonded to these edges, and a lip portion 64D that protrudes downward from the main portion 64C. The lip portion 64D is provided with a high level of flexibility. The main portion 64C of the first seal portion 64A is provided with a pair of laterally extending portions 84 that extend from the positions thereof corresponding to the left and right side edges of the lid plate 59 to the center side of the lid plate 59 along the back surface of the lid plate 59. The main portion 64C of the first seal portion 64A is wrapped around the terminal edge of the lid plate 59 so as to cover the terminal edge of the lid plate 59 without protruding from the outer profile of the lid plate 59.

As shown in FIG. 9, the free end of each laterally extending portion 84 fits into the gap 73 defined between the bent portion 71 of the reinforcing member 60 and the lid plate 59. The main portion 64C of the first seal portion 64A is provided with a front extending portion 85 extending rearward from the front edge of the lid plate 59 along the back surface of the lid plate 59 to the center side of the lid plate 59. As shown in FIG. 4, the front extending portion 85 fits into the gap 62E defined between the bent portion 62D of the bracket 62 and the lid plate 59.

As shown in FIG. 8, the second seal portion 64B has a main portion 64E that extends along the rear edge of the lid plate 59 and is bonded to the rear edge, and a lip portion 64F that protrudes rearward from the main portion 64E. In this case also, the main portion 64E of the second seal portion 64B is wrapped around the terminal edge of the lid plate 59 so as to cover the terminal edge of the lid plate 59 without protruding from the outer profile of the lid plate 59. When the lid 58 is in the closed position, the lip portion 64F of the second seal portion 64B extends toward the lower side of the flange portion 27 of the garnish 23, and overlaps with the flange portion 27 when viewed from above. In other words, the gap between the rear edge of the lid plate 59 and the garnish 23 is concealed by the second seal portion 64B. Preferably, the second seal portion 64B does not contact the garnish 23 or the housing 36.

As shown in FIG. 4, when the lid 58 is in the closed position, the rear edge of the lid plate 59 coincides with a part of the lid receiving recess 38 when viewed from above. As a result, moisture such as rainwater that has passed between the second seal portion 64B and the flange portion 27 of the garnish 23 falls into the lid receiving recess 38, and is prevented from coming into contact with the port device 30. The rainwater collected in the lid receiving recess 38 is guided into drain holes 90 formed in a bottom part of the lid receiving recess 38 as shown in FIG. 6, and is discharged out of the lid receiving recess 38.

In the present embodiment, the first seal portion 64A and the second seal portion 64B are continuous with each other, and jointly form an annular shape. In an alternate embodiment, the first seal portion 64A and the second seal portion 64B are made of separate pieces.

As shown in FIG. 5, a slot 94 is provided in a front portion of the housing 36, or more specifically, in a front end portion of the second member 47. A latch 96 (locking member) is attached, via a bracket 97, to a part of the upper member 13B of the bulkhead 13 located under the slot 94 so that the striker 63 that has moved into the slot 94 as the lid 58 is about to be fully closed is engaged by the latch 96. The latch 96 may be configured to release the engagement with the striker 63 by a solenoid mechanism which is controlled by a control unit not shown in the drawing.

The mode operation of the vehicle body front part structure 1 configured as described above will be described in the following. The lid plate 59 is desired to be as thin as possible in order for the light from the light emitter 57 to be transmitted to the outside of the vehicle. On the other hand, when the lid plate 59 is small in thickness, the lid plate 59 may be damaged or deformed by an impact load, and the port device 30 could be undesirably affected. Therefore, it is desirable to prevent the dislocation and deformation of the lid plate 59.

In this embodiment, as shown in FIGS. 4 and 11, the base material 59C of the lid plate 59 is reinforced by the reinforcing member 60. Thereby, the base material 59C of the lid plate 59 is protected from deformation even when subjected to an impact load. Further, when a downward load is applied to the lid plate 59, for instance, at the time of a vehicle collision, a moment may be applied to the lid plate 59 about a laterally extending axial line passing through the joints between the hinge arms 61 and the reinforcing member 60. In the present embodiment, the reinforcing member 60 is attached to an intermediate part of the back (lower) surface of the lid plate 59 with respect to the fore and aft direction. Therefore, the moment applied to the lid plate 59 can be smaller as compared with the case where the reinforcing member 60 is attached to a front end or rear end part of the lid plate 59 with respect to the fore and aft direction. Therefore, the deformation of the joints between the hinge arms 61 and the reinforcing member 60 is prevented from occurring, and the dislocation of the lid plate 59 can be prevented.

The lid plate 59 is provided with the bulging portion 65 having a convex shape facing upward. As a result, the lid plate 59 is not likely to be deformed under an impact load directed downward. Further, the reinforcing member 60 attached to the lower surface of the bulging portion 65 of the lid plate 59 further reinforces the lid plate 59 against deformation.

By providing the lid plate 59 with the light transmitting portion 59A, the light from the light emitter 57 can be transmitted to the outside. Thereby, the light emitter 57 can be used as a welcome light, and information can be transmitted to the outside of the vehicle by using the light emitter 57.

The reinforcing member 60 and the bracket 62 are attached to the back (inner) surface of the opaque portion 59B. Therefore, the reinforcing member 60 and the bracket 62 are concealed from view when the lid 58 is in the closed position. For this reason, the external appearance of the front part of the vehicle can be enhanced as compared to the case where the reinforcing member 60 or the bracket 62 is attached to the back surface of the light transmitting portion 59A.

Further, the reinforcing member 60 and the bracket 62 are bonded to the lid plate 59 by using an adhesive. Therefore, no screw hole or dent is required to be provided in the lid plate 59. Thereby, the mechanical properties of the lid plate are prevented from being compromised in any way, and an undesired leakage of light through the lid plate 59 can be avoided. The reinforcing member 60 is attached, via the hinge arms 61, to the housing 36 which is supported by the vehicle body 3 so that the lid plate 59 can be supported on the vehicle body 3 via the hinge arms 61 and the reinforcing member 60 in a highly secure manner.

When a lightweight object drops on the outer surface of the lid plate 59 or when the lid plate 59 is forcibly closed, a small compressive load is applied to the hinge arms 61 from the lid plate 59. Since the hinge arms 61 extend substantially perpendicularly to the lid plate 59, the hinge arms 61 are able to withstand the load as long as the magnitude of the load is within the elastic limit of the hinge arms 61. Thereby, any undesired dislocation of the lid plate 59 with respect to the housing 36 can be avoided.

Each hinge arm 61 is provided with a frangible portion 82 formed by bending the hinge arm 61 in a stepwise fashion. When the load applied to the hinge arms 61 is within the elastic limit thereof, the frangible portions 82 of the hinge arms 61 are elastically deformed, and the energy of the compressive load is absorbed. Further, once the load is removed, the hinge arms 61 are allowed to regain the original shape thereof so that the lid plate 59 is allowed to retain the original shape and position.

Further, at such a time, a load directed to the inside of the vehicle is applied to the junction between the lid plate 59 and the hinge arms 61, or more specifically, to the flange portions 74. This load tends to push each flange portion 74 toward the lid plate 59 via the corresponding bent portion 71. In particular, the hinge arms 61 push the flange portions 74 toward the lid plate 59 against this load. Accordingly, each bent portion 71 of the reinforcing member 60 is pushed toward to the lid plate 59 so that the free end of the corresponding laterally extending portion 84 of the seal member 64 is compressed. Thereby, the energy of this load is absorbed by the elastic deformation of each bent portion 71 and the compression of the free end of the corresponding laterally extending portion 84 so that the load can be supported without causing any permanent deformation. Thus, the free end of each laterally extending portion 84 of the seal member 64 functions as a first shock absorbing member 84A.

As shown in FIG. 9, the angle formed between each flange portion 74 and the corresponding hinge arm 61 is somewhat smaller than 90 degrees. Therefore, when a substantial load is applied to the lid plate 59 from outside, the bend between each flange portion 74 and the corresponding hinge arm 61 is allows to bend in an elastic manner so that the lid plate 59 and the hinge arm 61 are protected from permanent deformation.

When the lid plate 59 is forcibly closed, the striker 63 may collide with the latch 96 or any other surrounding part of the housing 36, and this causes an impact load to be transmitted from the striker 63 to the lid plate 59. At this time, the side walls 62B of the bracket 62 are elastically deformed so as to bend in the lateral direction. Owing to the elastic deformation of the side walls 62B of the bracket 62, the load applied to the striker 63 is absorbed, and the load transmitted to the lid plate 59 can be mitigated. As a result, deformation of the lid plate 59 can be prevented.

As shown in FIG. 4, the front extending portion 85 extends from the front edge of the lid plate 59 along the back surface (the inner surface) of the lid plate 59, and the free end part of the front extending portion 85 is received in the gap 62E defined between the bent portion 62D of the bracket 62 and the lid plate 59. When an impact load is applied to the lid plate 59, and is transmitted to the bracket 62, the free end of the front extending portion 85 is elastically compressed and the load is absorbed. This mitigates the load transmitted to the lid plate 59. Thus, the free end of the front extending portion 85 functions as a second shock absorbing member 85A (buffer material) that reduces the load transmitted to the lid plate 59, and prevents a permanent deformation of the lid plate 59.

Since the seal members 64 is provided with the laterally extending portion 84 each functioning as the first shock absorbing member 84A and the front extending portion 85 functioning as the second shock absorbing member 85A, no separate shock absorbing members are required to be prepared so that the overall structure can be simplified.

When the vehicle is traveling, the lid plate 59 is normally in the closed position. When an object collides with the lid plate 59 from above while the vehicle is traveling, a relatively large load may be applied to the lid plate 59 from above. The reinforcing member 60 is provided on the back surface (the inner surface) of the lid plate 59. Since the stiffness of the lid plate 59 is increased, the lid plate 59 is prevented from deforming under the collision load.

Furthermore, the reinforcing member 60 is provided in the intermediate part of the back surface of the lid plate 59 with respect to the fore and aft direction of the vehicle body 3, instead of a front or rear end part of the lid plate 59, the lid plate 59 is favorably protected from permanent deformation and damages.

The load applied to the lid plate 59 is transmitted to the hinge arms 61 via the reinforcing member 60. Since the hinge arms 61 are pivotally supported by the housing 36, the load tends to concentrate on the connecting portions between the hinge arms 61 and the reinforcing member 60, or on the left and right ends of the reinforcing member 60. The load applied to the lateral ends of the reinforcing member 60 are transmitted to the lid plate 59 over the entire length of the reinforcing member 60 so that the load on the lid plate 59 can be evenly distributed over a large area thereof. This also contributes to the reduction in the risk of causing a deformation in the lid plate 59.

Furthermore, the lateral ends of the reinforcing member 60 are formed with the bent portions 71, and the first shock absorbing member 84A is interposed between each bent portion 71 and the opposing inner surface of the lid plate 59 so that the parts of the lid plate 59 adjacent to the bent portions 71 are protected from any concentrated stress. This also contributes to the protection of the lid plate 59 from deformation when an impact load is applied to the lid plate 59.

The load applied to the lateral end portions of the reinforcing member 60 may be so great that the elastic limit of the hinge arms 61 may be exceeded. In such a case, the frangible portions 82 of the hinge arms 61 consisting of stepwise bends may undergo a plastic deformation. Such deformation help reduce the risk of permanently deforming the lid plate 59.

Alternatively or additionally, the bend between each flange portion 74 and the corresponding hinge arm 61 may undergo a plastic deformation.

When an excessive impact load is applied to the lid plate 59, the striker 63 may collide with the latch 96 so forcibly that an excessive impact load may be transmitted from the striker 63 to the lid plate 59. In such a case, the side walls 62B of the bracket 62 are elastically deformed so as to bend in the lateral direction. Owing to the elastic deformation of the side walls 62B of the bracket 62, the load applied to the striker 63 is absorbed, and the load transmitted to the lid plate 59 can be mitigated. As a result, deformation of the lid plate 59 can be prevented.

Furthermore, in the foregoing embodiment, the frangible portions 82 are provided on the hinge arms 61. When a load exceeding the elastic limit is applied to the hinge arms 61, the hinge arms 61 are plastically deformed so as to be bent at the frangible portions 82. The deformation of the hinge arms 61 absorbs the load applied to the lid plate 59 so that the deformation of the lid plate 59 can be prevented.

When a load is applied to the lid plate 59 from above, a downward load may be applied to the housing 36 via the hinge arms 61. As a result, the first support members 42 may be bent at the bends 42C, and the second support members 43 may be bent at the bends 43C so that the energy of the load can be favorably absorbed. As a result, the deformation and dislocation of the lid plate 59 relative to the housing 36 can be avoided, and the deformation of the housing 36 can be avoided.

When the port opening 21 is provided in a front part of the front hood 7, and the lid 58 is in the open position, the open side of the housing 36 faces the port opening 21. Therefore, a charging cable or the like can be easily connected to the port 34 from the vehicle front side with ease.

The present invention has been described in terms of a specific embodiment, but the present invention is not limited by such an embodiment, and can be modified in various ways without departing from the spirit of the present invention. For instance, the port 34 is not limited to a charging port and/or power feeding port, but may also be a fuel filling port having an inlet for filling fuel such as gasoline and hydrogen.

The invention claimed is:

1. A vehicle body front structure, comprising:
   a housing receiving a port device therein and having an open side facing outward of a vehicle body; and
   a lid configured to selectively close the open side of the housing;
   wherein the lid includes a lid plate including a light transmitting base material, and a reinforcing member attached to an inner surface of the lid plate, the reinforcing member extending along an intermediate part of the lid plate with respect to a fore and aft direction of the vehicle body,
   wherein a port opening is provided in a front hood of the vehicle body,
   wherein the reinforcing member comprises a strip of material extending laterally on the inner surface of the lid plate, the reinforcing member being configured in such a manner that lateral ends of the reinforcing member are supported by corresponding parts of the housing when the lid is in a closed position,
   wherein a pair of hinge arms extend from either lateral end of the reinforcing member into the housing to be rotatably supported by the housing at free ends of the hinge arms, and
   wherein each hinge arm is provided with a frangible portion, and
   wherein each frangible portion is located between an upper end and a lower end of each hinge arm and each frangible portion is a location of preferential failure.

2. The vehicle body front structure according to claim 1, wherein the lid plate includes a light transmitting portion and an opaque portion, and the reinforcing member is attached to the opaque portion of the lid plate.

3. The vehicle body front structure according to claim 2, wherein the lid plate has a bulging portion providing an outwardly convex profile, and the reinforcing member is attached to the bulging portion.

4. A vehicle body front structure, comprising:
   a housing receiving a port device therein and having an open side facing outward of a vehicle body; and
   a lid configured to selectively close the open side of the housing;
   wherein the lid includes a lid plate including a light transmitting base material, and a reinforcing member attached to an inner surface of the lid plate, the reinforcing member extending along an intermediate part of the lid plate with respect to a fore and aft direction of the vehicle body,
   wherein a port opening is provided in a front hood of the vehicle body,
   wherein the reinforcing member comprises a strip of material extending laterally on the inner surface of the lid plate, the reinforcing member being configured in such a manner that lateral ends of the reinforcing member are supported by corresponding parts of the housing when the lid is in a closed position, and
   wherein a first shock absorbing member is interposed between each lateral end of the reinforcing member and an opposing part of the inner surface of the lid plate.

5. The vehicle body front structure according to claim 4, wherein the lid plate includes a light transmitting portion and an opaque portion, and the reinforcing member is attached to the opaque portion of the lid plate.

6. The vehicle body front structure according to claim 4, wherein the lid plate has a bulging portion providing an outwardly convex profile, and the reinforcing member is attached to the bulging portion.

7. The vehicle body front structure according to claim 4, further comprising a seal member fitted on an outer periphery of the lid plate, wherein the seal member includes a main portion extending along the outer periphery of the lid plate, and a pair of first extensions extending from the main portion along the inner surface of the lid plate, a free end part of each first extension forming the first shock absorbing member.

8. A vehicle body front structure, comprising:
   a housing receiving a port device therein and having an open side facing outward of a vehicle body; and
   a lid configured to selectively close the open side of the housing;
   wherein the lid includes a lid plate including a light transmitting base material, and a reinforcing member attached to an inner surface of the lid plate, the reinforcing member extending along an intermediate part of the lid plate with respect to a fore and aft direction of the vehicle body, and
   wherein an engaged member is attached to the inner surface of the lid plate via a bracket, and a corresponding engaging member configured to cooperate with the engaged member is attached to a corresponding position of the vehicle body, the bracket including a pair of side walls attached to the inner surface of the lid plate at base ends thereof and facing in a lateral direction in a mutually spaced apart relationship, and a bottom wall connected between free ends of the side walls, the engaged member being fixed to the bottom wall.

9. The vehicle body front structure according to claim 8, wherein the lid plate includes a light transmitting portion and an opaque portion, and the reinforcing member is attached to the opaque portion of the lid plate.

10. The vehicle body front structure according to claim 8, wherein the lid plate has a bulging portion providing an outwardly convex profile, and the reinforcing member is attached to the bulging portion.

11. The vehicle body front structure according to claim 8, wherein the bracket is bonded to the lid plate.

12. The vehicle body front structure according to claim 8, wherein the base ends of the side walls are provided with flanges extending away from each other, and at least partly bonded to the inner surface of the lid plate, and a second shock absorbing member is interposed between each flange and the inner surface of the lid plate.

13. The vehicle body front structure according to claim 8, further comprising a seal member fitted on an outer periphery of the lid plate, wherein the seal member includes a main portion extending along the outer periphery of the lid plate, and a second extension extending from the main portion along the inner surface of the lid plate, and the second shock absorbing member is formed by a free end part of the second extension.

14. The vehicle body front structure according to claim 8, wherein the bracket is attached to the opaque portion of the lid.

15. The vehicle body front structure according to claim 8, wherein the reinforcing member and the bracket are formed integrally.

16. The vehicle body front structure according to claim 8, wherein the housing is supported by the vehicle body via a support member, and the support member is provided with a frangible portion.

17. The vehicle body front structure according to claim 8, wherein the reinforcing member is bonded to the inner surface of the lid plate.

\* \* \* \* \*